(12) United States Patent
Foti

(10) Patent No.: US 7,770,896 B2
(45) Date of Patent: Aug. 10, 2010

(54) LOW-FRICTION ANNULAR SEALING ASSEMBLY FOR A CENTRIFUGAL PUMP, IN PARTICULAR AN INTERNAL COMBUSTION ENGINE COOLING LIQUID PUMP

(75) Inventor: Claudio Foti, Poirino (IT)

(73) Assignee: Aktiebolaget SKF, Gothenburg (SE)

( * ) Notice: Subject to any disclaimer, the term of this patent is extended or adjusted under 35 U.S.C. 154(b) by 407 days.

(21) Appl. No.: 11/807,169

(22) Filed: May 25, 2007

(65) Prior Publication Data
US 2007/0290453 A1  Dec. 20, 2007

(30) Foreign Application Priority Data
May 30, 2006   (EP) ................... 06425367

(51) Int. Cl.
*F16J 15/32* (2006.01)
(52) U.S. Cl. ...................... 277/551; 277/353
(58) Field of Classification Search ................ 277/351, 277/353, 551, 562
See application file for complete search history.

(56) References Cited

U.S. PATENT DOCUMENTS

| | | | |
|---|---|---|---|
| 4,501,431 A | * | 2/1985 | Peisker et al. ............... 277/559 |
| 4,689,190 A | | 8/1987 | Peisker et al. |
| 4,928,979 A | | 5/1990 | Nagasawa |
| 5,346,662 A | | 9/1994 | Black et al. |
| 6,354,598 B1 | * | 3/2002 | Huang ......................... 277/551 |
| 6,428,015 B1 | | 8/2002 | Iwakata |
| 6,789,805 B2 | * | 9/2004 | Sassi .......................... 277/549 |
| 2002/0185819 A1 | * | 12/2002 | Sassi .......................... 277/353 |

FOREIGN PATENT DOCUMENTS

| | | |
|---|---|---|
| WO | 00/00763 | 1/2000 |
| WO | 00/00763 A | 1/2000 |

* cited by examiner

*Primary Examiner*—Thomas B Will
*Assistant Examiner*—Gilbert Y Lee
(74) *Attorney, Agent, or Firm*—Ladas and Parry LLP

(57) ABSTRACT

A sealing assembly including a sealing member made of elastomeric material and PTFE; a supporting armature; and an annular L-shaped shield cooperating, in use, with the sealing member. The armature has a sleeve portion and a radial flange portion partly supporting a radial portion of the sealing member, projecting towards the axis of symmetry and made of elastomeric material with no supporting armature. The radial portion increases in axial size towards the axis of symmetry, and supports, on its free end, a sleeve made of PTFE, the sleeve having a cylindrical first end portion projecting axially, and a conical second end portion projecting axially on the opposite side to and by a greater amount than the first end portion to form an elastically deformable axial sealing lip extending, in undeformed conditions, farther away from the axis of symmetry as it comes away from the flange portion.

5 Claims, 1 Drawing Sheet

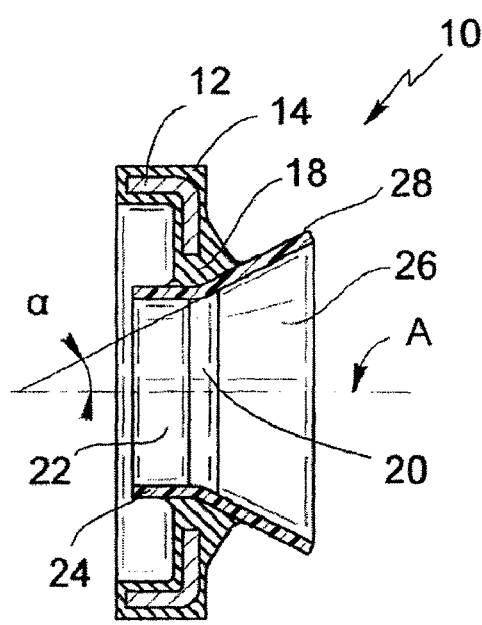
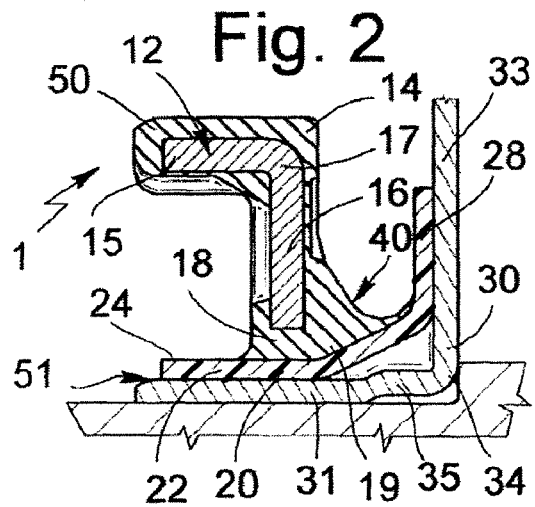
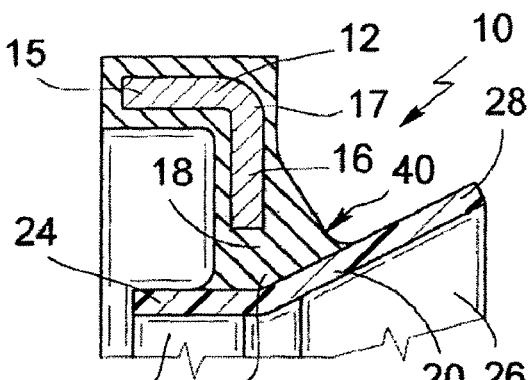
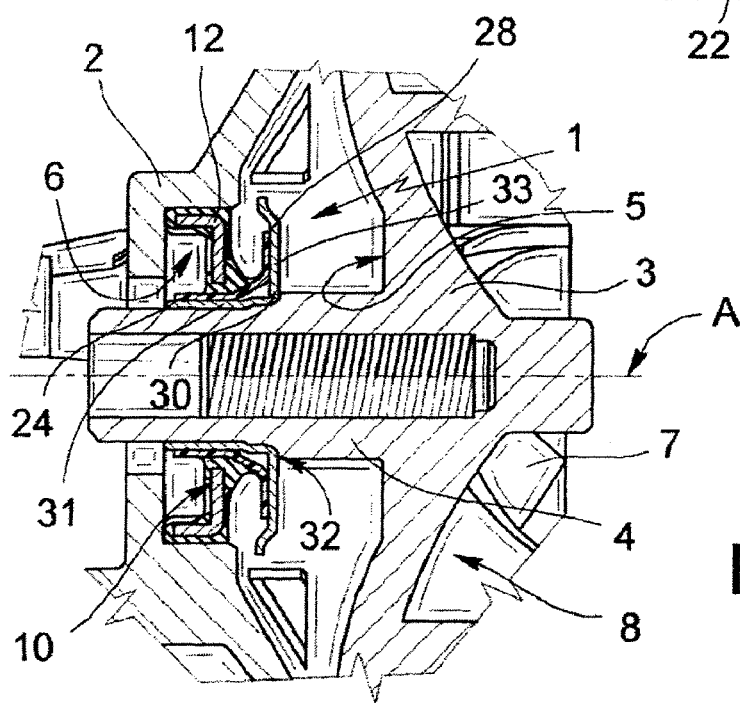
Fig. 1
Fig. 2
Fig. 3
Fig. 4

LOW-FRICTION ANNULAR SEALING ASSEMBLY FOR A CENTRIFUGAL PUMP, IN PARTICULAR AN INTERNAL COMBUSTION ENGINE COOLING LIQUID PUMP

The present invention relates to an annular sealing assembly, of the type used on vehicle internal combustion engine water pumps, for sealing between a rotary member, such as the pump impeller (and relative drive shaft), and a stationary member, such as the pump casing, from which the impeller drive shaft must project in fluidtight manner to receive rotation, by which to drive the impeller, from the engine transmission.

BACKGROUND OF THE INVENTION

In water pumps of the above type, sealing between the centrifugal impeller (and relative shaft) and the casing is effected using a sealing assembly comprising a first sealing ring for sliding sealing engagement fitted to the pump casing, coaxially with the impeller shaft, and which also exert a static sealing on the casing; and a second sealing ring for sliding sealing engagement fitted to the impeller shaft, which as well exerts a static sealing on the shaft, and which is loaded axially by a spring packed between the rear face of the impeller (opposite the front work face of the impeller fitted with the blades) and the second ring. Dynamic in-service sealing is therefore performed by the sliding seal defined between the two rings, which are pressed into contact with each other frontally by the spring in a direction parallel to the axis of rotation (axial sealing).

Given the high axial loads the seal is normally subjected to in use, sliding sealing rings are normally made of metal. As a result, sealing of the water in the delivery compartment of the pump is not altogether satisfactory, especially when the pump is idle. Moreover, the known sealing assembly described is bulky, particularly axially, and is complicated to assemble.

SUMMARY OF THE INVENTION

It is an object of the present invention to provide a sealing assembly, for insertion between two relatively-moving members—in the example described, between a centrifugal impeller of a water pump (and relative shaft) and the pump casing, designed to eliminate the drawbacks of the known art, and which, in particular, provides for effective static and dynamic sealing of the water in the delivery compartment of the pump, both with the pump running and idle, and is also compact, extremely easy to assemble, and cheap to produce and assemble.

According to the present invention, there is provided a sealing assembly, for insertion between two relatively-rotating members, in particular between a centrifugal impeller and the casing of an internal combustion engine water pump (engine cooling circuit feed pump), as claimed in the attached claims.

More specifically, the sealing assembly comprises an annular sealing member made partly of elastomeric material and partly of low-friction polymer material; and a substantially rigid supporting armature embedded in the elastomeric material. The supporting armature comprises a sleeve portion; and a flange portion, which extends radially from a first end of the sleeve portion towards an axis of symmetry of the sleeve portion, and partly supports a radial portion of the sealing member, projecting towards the axis of symmetry and made entirely of elastomeric material with no supporting armature.

The elastomeric radial portion of the sealing member increases in axial size towards the axis of symmetry, and supports, on its free end, a sleeve made of low-friction polymer material, in particular PTFE, which has been cured to the elastomeric radial portion; the sleeve is arranged asymmetrically with respect to the supporting armature having a cylindrical first end portion projecting axially parallel to and on the same side as the sleeve portion of the supporting armature to form a radial sealing lip, and having a conical second end portion projecting axially on the opposite side to and by a greater amount than the first end portion to form an elastically deformable axial sealing lip which extends, towards its free end, away from the axis of symmetry of the sealing assembly, which is coincident with the axis of relative rotation of said members (impeller and pump casing).

When undeformed, the elastically deformable axial sealing lip extends farther and farther away from the axis of symmetry as it comes away from the flange portion of the supporting armature, so forming an acute angle with the axis of symmetry.

The sealing assembly also comprises an annular shield having an L-shaped radial section, and which cooperates in sliding manner, in use, with the sealing lips of the sealing member. The shield is assembled separately from the sealing member, and is only fitted to the sealing assembly when concentrically assembling the relatively-rotating members. More specifically, the annular shield comprises a sleeve portion interference-fitted to and angularly integral, in use, with a first member (impeller shaft) and coaxial with the sleeve portion of the supporting armature; and a flange portion extending radially on the opposite side to the axis of symmetry.

The radial sealing lip cooperates, in use, in sliding manner with a lateral surface of the sleeve portion of the shield, while the axial sealing lip cooperates, in use, in sliding manner with a frontal surface of the flange portion of the shield. More specifically, the axial sealing lip projects from the armatureless elastomeric radial portion sufficiently to flex, in use, into a deformed work configuration, in which a predetermined length of its free end is arranged perpendicularly to the axis of symmetry.

The sealing member can thus be fitted inside a seat in the pump casing separately from the shield, which can be fitted directly to and integral with the impeller shaft, so as to rest against an axial shoulder formed on the same side as the rear face of the impeller. When the water pump is assembled, the shield rests axially against the axial sealing lip to move it into the work configuration and so ensures a sufficient axial load on the sealing member to guarantee effective sealing without using springs.

Moreover, the sealing assembly according to the invention is relatively compact, particularly axially, and at any rate much more compact than conventional water pump sealing assemblies. Finally, the sealing assembly as a whole is structurally simple, is extremely easy to assemble, even to the extent of employing automatic robot systems involving only a few simple movements, and is also cheap to produce. And all this while at the same time ensuring equally effective sealing whether the pump is idle or running, low in-service friction (which helps to reduce fuel consumption), and, above all, a long working life.

BRIEF DESCRIPTION OF THE DRAWINGS

Further characteristics and advantages of the present invention will be now described with reference to a non- FIG. 1 shows a longitudinal radial section of a sealing assembly in accordance with the invention in a first configuration prior to assembly;

FIG. 2 shows a larger-scale longitudinal radial section of the FIG. 1 sealing assembly in a second in-service configuration;

FIG. 3 shows a larger-scale detail of FIG. 1;

FIG. 4 shows a schematic radial section of a vehicle engine water pump fitted with the sealing assembly according to the invention.

DETAILED DESCRIPTION OF THE INVENTION

With reference to FIGS. 1 to 4, number 1 indicates a sealing assembly insertable between two relatively-rotating members 2, 3 defined, in the example shown, by a casing 2 and a centrifugal impeller 3 of a water pump (cooling liquid feed pump) of a known internal combustion engine, not shown for the sake of simplicity.

Impeller 3 (FIG. 4) is fitted integrally to (in the example shown, formed in one piece with) a shaft 4, which projects from a rear face 5 of impeller 3 and extends idly, in use, through a through seat 6 in casing 2; the face of impeller 3 opposite rear face 5 is the work face of impeller 3, fitted with blades 7; and impeller 3 is housed in a delivery compartment 8 inside casing 2 and accessible from the outside through seat 6.

Sealing assembly 1 comprises an annular sealing member 10 (FIGS. 1 and 3) made partly of elastomeric material and partly of low-friction polymer material, typically PTFE (polytetrafluoroethylene) or other polymer of like characteristics; and a substantially rigid supporting armature 12 preferably made of coined sheet metal. Supporting armature 12 is embedded in the elastomeric material of an all-elastomer portion 14 of sealing member 10, and comprises a sleeve portion 15; and a flange portion 16, which extends radially towards an axis of symmetry A of sleeve portion 15, coincident, in use, with the axis of relative rotation of members 2, 3.

More specifically, flange portion 16 projects radially from a first end 17 of sleeve portion 15, and partly supports a radial portion 18 of sealing member 10, projecting towards axis A. More specifically, radial portion 18 forms an integral part of portion 14 embedding supporting armature 12, is also made entirely of elastomeric material, but is without supporting armature 12 and therefore to a certain extent elastically deformable.

More specifically, elastomeric radial portion 18 of sealing member 10 increases in axial size (i.e. parallel to axis A) towards axis A, i.e. gets thicker towards its free end 19, where portion 18 is of maximum thickness (i.e. maximum axial size).

At free end 19, elastomeric portion 18 supports a sleeve 20 made entirely of said low-friction polymer material (typically PTFE or equivalent), and which has been cured to elastomeric radial portion 18 to form a very strong chemical-physical bond between the two parts, so that sleeve 20 can only be detached from portion 18 by braking one or both of the parts.

According to one aspect of the invention, sleeve 20 is arranged asymmetrically, in the axial direction, with respect to supporting armature 12, and in particular with respect to the position of radial flange portion 16, having a cylindrical first end portion 22 projecting axially parallel to and on the same side as sleeve portion 15 of supporting armature 12 to form a radial sealing lip 24, and having a conical second end portion 26 projecting axially on the opposite side to and by a greater amount than first end portion 22 to form an elastically deformable axial sealing lip 28 which extends, towards its free end, away from axis of symmetry A.

When undeformed (FIGS. 1 and 3), elastically deformable axial sealing lip 28 extends farther and farther away, in a straight direction, from axis of symmetry A as it comes away from the flange portion 16, forming in such a configuration an acute angle $\alpha$ (i.e. of less than 45°) with axis A.

In a preferred embodiment of the invention, sealing assembly 10 also comprises an annular shield 30 having an L-shaped radial section, and which cooperates in sliding manner, in use, with sealing lips 24, 28 of sealing member 10. Annular shield 30 (FIGS. 2 and 4) comprises a sleeve portion 31 which is secured, in use, angularly integral with, and preferably interference-fitted to, shaft 4 of impeller 3, rests axially against a shoulder 32 formed on shaft 4 and facing the same way as rear face 5 of impeller 3, and is coaxial with sleeve portion 15 of supporting armature 12; and a flange portion 33 extending radially, on the opposite side to axis of symmetry A, from a first end 34 (FIG. 2) of sleeve portion 31.

Radial sealing lip 24 cooperates, in use, in sliding manner with a radially outer lateral surface of sleeve portion 31, while axial sealing lip 28 cooperates, in use, in sliding manner with a front surface of flange portion 33 of shield 30, facing the same way, in use, as rear face 5 of impeller 3, i.e. facing seat 6 formed in casing 2.

Close to flange portion 33, in particular at end 34, sleeve portion 31 of shield 30 comprises a coined portion 35 (FIG. 2) defining a radial step, which extends away from axis A, faces seat 6, and rests, in use, against shoulder 32.

Axial sealing lip 28 projects from elastomeric radial portion 18, having no supporting armature 12, sufficiently to flex in use (sleeve 20, in fact, is relatively thin, and thinner than supporting armature 12) into a deformed work configuration (FIGS. 2 and 4), in which a predetermined length of its free end is arranged perpendicular to axis of symmetry A, and forms a sort of flange portion parallel to flange portion 33 of shield 30.

To assist deformation of lip 28, elastomeric radial portion 18 of sealing member 10 is bounded laterally, towards axial sealing lip 28, by a conical surface 40 (FIGS. 2, 3) having an opposite taper to that of end portion 26 of PTFE polymer sleeve 20 defining axial sealing lip 28.

According to a further characteristic of the seal illustrated, sleeve portion 15 of supporting armature 12 is embedded in a corresponding assembly and static sealing portion 50 of sealing member 10. Portion 50 is made entirely of elastomer, forms part of portion 14 (which also covers at least part of flange portion 16), and is interference-fitted, in use, inside seat 6.

In actual use, components 10 and 30 of sealing assembly 1 according to the invention are assembled separately, component 10 inside seat 6, and component 30 to shaft 4, with impeller 3 disassembled from casing 2. Members 2 and 3 are then fitted together by axially inserting sleeve portion 31 of shield 30—which, for the purpose, has a bevelled end 51 opposite end 34—inside cylindrical portion 22 with, according to the invention, a predetermined amount of radial interference which is only compensated partly by the relatively limited elasticity of portion 18.

A sliding radial seal is thus formed between lip 24 and sleeve portion 31, the seal being loaded, without using springs, by a predetermined elastic force, and, as opposed to being linear or almost linear (as in normal elastomeric lip seals), covering most of the inner lateral surface of cylindrical portion 22.

At the same time, as stated, lip 28 rests against flange portion 33 of shield 30, and, by virtue of the conical shape of end 26 of sleeve 20, the shape of portion 18, and the presence of coined portion 35, is gradually deformed elastically into the FIG. 2 configuration, in which a nonlinear portion of lip 28 is arranged substantially perpendicular to axis A, thus subjecting lip 28, also with the aid of the elastic reaction of portion 18, to a predetermined elastic axial force, again with no springs used.

The invention claimed is:

1. A sealing assembly, for insertion between two relatively-rotating members, the sealing assembly comprising:
   an annular sealing member made partly of an elastomeric material and partly of a low-friction polymer material, and
   a substantially rigid supporting armature embedded in the elastomeric material,
   wherein the supporting armature comprises a sleeve portion, and a flange portion which extends radially from a first end of the sleeve portion towards an axis of symmetry of the sleeve portion, and partly supports an elastomeric radial portion of the sealing member, projecting towards the axis of symmetry and made entirely of the elastomeric material with no supporting armature;
   wherein the elastomeric radial portion of the sealing member increases in axial size towards the axis of symmetry, and supports, on its free end, a sleeve made of a polymer material, and which has been cured to the elastomeric radial portion, said sleeve being arranged asymmetrically with respect to the supporting armature, having a cylindrical first end portion projecting axially parallel to the sleeve portion of the supporting armature to form a radial sealing lip, and having a conical second end portion projecting axially on a side opposite to and by a greater amount than the first end portion to form an elastically deformable axial sealing lip which extends, towards its free end, away from said axis of symmetry; said cylindrical first end portion projecting on the same side as the sleeve portion of the supporting armature; and wherein:
   (a) said axial sealing lip projects, from the elastomeric radial portion of the sealing member having no supporting armature, sufficiently to flex, in use, into a deformed work configuration in which a predetermined length of its free end is arranged perpendicular to the axis of symmetry;
   (b) said elastomeric radial portion of the sealing member is bounded laterally, towards said axial sealing lip, by a conical surface having an opposite taper to that of said second end portion of the polymer sleeve defining said axial sealing lip to provide a deformation of the lip;
   (c) said sealing assembly further-comprises an annular shield having an L-shaped radial section, and which cooperates in sliding manner, in use, with said sealing lips of the sealing member;
   (d) said shield comprises a sleeve portion interference-fitted to and angularly integral, in use, with a first of said relatively-rotating members and coaxial with the sleeve portion of said supporting armature; and a flange portion extending radially on the opposite side to the axis of symmetry of the sleeve portion of the shield, and from a first end of the sleeve portion of the shield; said radial sealing lip cooperating, in use, in sliding manner with a lateral surface of said sleeve portion of the shield, and said axial sealing lip cooperating, in use, in sliding manner with a front surface of the flange portion of the shield with a nonlinear portion of said lip arranged substantially perpendicular to said axis;
   (e) said sleeve portion of said shield is axially insertable, for the purpose having a beveled end opposite to its first end, inside said cylindrical portion with a predetermined amount of radial interference which is only compensated partly by the relatively limited elasticity of said elastomeric radial portion,
   (f) said elastomeric radial portion is shaped so as to ensure a sufficient axial load on the sealing member to provide an effective sealing in use without using springs.

2. A sealing assembly as claimed in claim 1, wherein when undeformed, said elastically deformable axial sealing lip extends farther and farther away, in a straight direction, from the axis of symmetry, as it comes away from said flange portion of the supporting armature, forming an acute angle with the axis of symmetry.

3. A sealing assembly as claimed in claim 2, wherein close to said flange portion of the shield, said sleeve portion of the shield comprises a coined portion defining a radial step extending away from the axis of symmetry of the sleeve portion of the shield.

4. A sealing assembly as claimed in claim 1, wherein said polymer sleeve is made of PTFE.

5. A sealing assembly as claimed in claim 1, wherein said sleeve portion of the supporting armature is embedded in a corresponding assembly and static sealing portion of the sealing member, made entirely of elastomer and which is interference-fitted, in use, inside a seat in a second of said relatively-rotating members.

* * * * *